(12) United States Patent
Golubkov

(10) Patent No.: US 10,601,086 B2
(45) Date of Patent: Mar. 24, 2020

(54) COOLING SYSTEM FOR COOLING ELECTROCHEMICAL CELLS OF A BATTERY SYSTEM

(71) Applicant: SAMSUNG SDI CO., LTD., Yongin-si, Gyeonggi-do (KR)

(72) Inventor: Andrej Golubkov, Graz (AT)

(73) Assignee: Samsung SDI Co., Ltd., Yongin-si (KR)

(*) Notice: Subject to any disclaimer, the term of this patent is extended or adjusted under 35 U.S.C. 154(b) by 185 days.

(21) Appl. No.: 15/793,764

(22) Filed: Oct. 25, 2017

(65) Prior Publication Data

US 2018/0115028 A1  Apr. 26, 2018

(30) Foreign Application Priority Data

Oct. 26, 2016 (EP) .................... 16195687

(51) Int. Cl.

| H01M 10/613 | (2014.01) |
|---|---|
| H01M 2/10 | (2006.01) |
| H01M 10/625 | (2014.01) |
| H01M 10/6555 | (2014.01) |
| H01M 10/6551 | (2014.01) |
| H01M 10/653 | (2014.01) |

(Continued)

(52) U.S. Cl.
CPC ....... *H01M 10/613* (2015.04); *H01M 2/1077* (2013.01); *H01M 6/5038* (2013.01); *H01M 8/006* (2013.01); *H01M 8/04007* (2013.01); *H01M 10/625* (2015.04); *H01M 10/647* (2015.04); *H01M 10/653* (2015.04); *H01M 10/6551* (2015.04); *H01M 10/6554* (2015.04); *H01M 10/6555* (2015.04); *H01M 10/6567* (2015.04); *H01M 2/1061* (2013.01); *H01M 10/617* (2015.04); *H01M 10/6556* (2015.04); *H01M 2220/20* (2013.01)

(58) Field of Classification Search
CPC .... H01M 6/50; H01M 10/613; H01M 10/625; H01M 10/647; H01M 10/6554
See application file for complete search history.

(56) References Cited

U.S. PATENT DOCUMENTS

| 2011/0104545 A1 | 5/2011 | Meintschel et al. |
| 2012/0171532 A1 | 7/2012 | Lee et al. |
| 2012/0282506 A1 | 11/2012 | Hohenthanner et al. |

FOREIGN PATENT DOCUMENTS

| KR | 10-2011-0080537 | 7/2011 |
| KR | 10-2014-0145250 | 12/2014 |
| WO | WO 2011/089121 | 7/2011 |

OTHER PUBLICATIONS

Machine Translation of: WO 2011/089121A, Demitter et al., Jul. 21, 2011.*

(Continued)

*Primary Examiner* — Kenneth J Douyette
(74) *Attorney, Agent, or Firm* — Lewis Roca Rothgerber Christie LLP

(57) ABSTRACT

A cooling system for cooling electrochemical cells of a battery system is provided. The cooling system includes a housing configured to accommodate a plurality of stacked electrochemical cells. The housing includes a structured side wall having a protrusion therein, and the protrusion is adapted to receive a section of a thermally conductive element arranged between two adjacent ones of the stacked electrochemical cells.

13 Claims, 4 Drawing Sheets

(51) Int. Cl.
*H01M 10/647* (2014.01)
*H01M 10/6554* (2014.01)
*H01M 10/6567* (2014.01)
*H01M 6/50* (2006.01)
*H01M 8/00* (2016.01)
*H01M 8/04007* (2016.01)
H01M 10/6556 (2014.01)
H01M 10/617 (2014.01)

(56) References Cited

OTHER PUBLICATIONS

European Search Report dated Dec. 23, 2016, for corresponding European Patent Application No. 16195687.5 (8 pages).

\* cited by examiner

COOLING SYSTEM FOR COOLING ELECTROCHEMICAL CELLS OF A BATTERY SYSTEM

CROSS-REFERENCE TO RELATED APPLICATION

This application claims priority to and the benefit of European Patent Application No. 16195687.5, filed on Oct. 26, 2016 in the European Patent Office, the disclosure of which is incorporated herein by reference in its entirety.

BACKGROUND

1. Field

Aspects of embodiments of the present invention relate to a cooling system for cooling electrochemical cells of a battery system.

2. Description of the Related Art

During operation of a battery system, high currents are drawn from the battery cells, such as electrochemical cells. Due to ohmic losses, such high currents may cause the electrochemical cells to significantly heat up, thereby decreasing the service life of the electrochemical cells. Generally, active and passive cooling systems are included in or are used with battery systems, which cool down the cells during operation of the battery system.

Due to cost and safety issues, liquid cooling fluids are generally avoided inside of a housing of a battery system. Instead, the electrochemical cells inside the housing of the battery system are generally cooled via outside surfaces of the cells, such that cost-efficient housings including or consisting of plastic having low thermal conductivity may be used.

For battery systems including so-called electrochemical pouch cells (e.g., pouch-type cells), metal plates may be arranged between the pouch cells to conduct heat away from the cells to a heat exchanger.

However, many cooling systems for battery systems including the pouch-type electrochemical cells do not provide sufficient cooling of the cells and/or are very expensive to produce.

SUMMARY

One or more drawbacks of the prior art may be avoided or at least reduced or mitigated according to embodiments of the present invention. For example, a cooling system for cooling electrochemical cells of a battery system is provided. According to one embodiment, the cooling system includes a housing adapted to receive (e.g., to accommodate) a plurality of stacked electrochemical cells. According to embodiments of the present invention, the housing includes a structured side wall with a protrusion therein, and the protrusion is adapted to receive (e.g., to accommodate) a section of a thermally conductive element arranged between adjacent ones of the stacked electrochemical cells.

The cooling system, according to embodiments of the present invention, allows for direct transfer of heat from the electrochemical cells of the battery system to the housing of the battery system and, thereby, to outside of the housing. Therefore, such a cooling system allows for efficient cooling of a battery system.

The side wall may be a structured side wall when the protrusion is integrally formed in the side wall (e.g., the protrusion is formed by the side wall).

The protrusion may be integrally formed in the structured side wall. In some embodiments, the protrusion is adapted to house (or accommodate) at least three sides of a section of a thermally conductive element of the battery system.

The structured side wall may be arranged on a bottom side of the housing. In some embodiments, the structured side wall may be a bottom side of the housing.

In some embodiments, the housing includes a plurality of first side walls (e.g., two first side walls) extending parallel to a height of the electrochemical cells received by the housing and a plurality of second side walls (e.g., two second side walls) arranged perpendicular to the first side walls. The structured side wall may be one of the second side walls of the housing. Further, the structured side wall may be one of the first side walls of the housing. The cooling system according to embodiments of the present invention allows for a slim battery system and enables efficient transfer of heat from inside of the cooling system to outside of the same.

The structured side wall may have a plurality of protrusions therein for the reception of a plurality of thermally conductive elements. The protrusions give the structured side wall a meandering cross-section, the cross-section being in an imaginary plane that is parallel to a height of the housing of the cooling system. The greater the number of protrusions, the greater number of thermally conductive elements that may be used to transfer heat from the cells to outside of the battery system. Furthermore, the larger the size of an area where heat is conducted through the wall of the housing to the surrounding environment, the greater the amount of heat conducted to outside of the battery system. Therefore, in such embodiments, the heat conduction efficiency of the cooling system is increased.

In some embodiments, a protrusion in the structured side wall has a U-shaped or substantially U-shaped cross-section. A protrusion having such a cross-section provides for a tight and strong form-fit connection between the thermally conductive element of the battery system and the housing of the cooling system. Furthermore, a ready-to-assemble cell stack including the thermally conductive elements may be easily slid into the protrusions of the structured side wall of the housing to assemble the battery system.

In some embodiments, the protrusion is a groove in the structured side wall. Such grooves enable easy assembly of the battery system.

The protrusion may extend in or substantially extend in a direction parallel to the first side walls of the housing. The protrusion may enlarge the total length, the total height, or the total width of the housing of the cooling system (e.g., the protrusion may form the outermost surface of the housing of the cooling system).

In some embodiments, the housing includes a plastic material. Plastic materials are cost efficient and provide stable and sufficient thermal insulation.

The cooling system may have a plurality of protrusions within the structured side wall for the reception of thermally conductive elements. A space between adjacent ones of the protrusions at an outer side of the structured side wall forms an outer receiving structure adapted to receive a cooling fin. In such embodiments, heat generated by the electrochemical cells within the battery system including the cooling system may be efficiently transferred via the thermally conductive elements to the housing of the cooling system and via the housing to the cooling fins of an external component of the cooling system.

In some embodiments, the cooling system may further include a holding device adapted to receive the housing. The holding device may have a cooling fin corresponding to an outer receiving structure of the structured side wall. For example, the holding device may be connected to a further component, for example, to a component of a vehicle. The cooling fin is adapted to engage the outer receiving structure of the structured side wall; for example, the cooling fin may be adapted to engage the outer receiving structure of the structured side wall in a form-fit connection.

The holding device may have a body section with the cooling fin extending from the body section. Such a design of the holding device allows for a stable connection of the housing of the cooling system with the holding device and of the holding device with a further component.

In some embodiments, when the cooling system and the battery system are mounted to each other, the housing of the cooling system stands on the holding device.

In some embodiments, the body section of the holding device includes a channel, thereby enabling a cooling fluid to flow through the body section. In such embodiments, the cooling fluid flowing through the channel and then to outside of the housing of the cooling system and outside of the battery system may be used to improve the cooling efficiency of the cooling system. In some embodiments, the channel extends in a direction perpendicular to the depth of the protrusion. Further, the channel extends in a direction perpendicular to the height of the electrochemical cell received by the housing.

The cooling fin may include a thermally conductive material. In such embodiments, the thermal conductivity of the cooling system is further improved.

Further, the structured side wall may have n protrusions arranged next to each other along the length of the cross-section of the structured side wall, and the holding device is clamped around the first and the n-th protrusions.

According to an embodiment of the present invention, a battery system including a cooling system is provided. The battery system includes a plurality of stacked electrochemical cells arranged within a housing and a thermally conductive element arranged between adjacent ones of the stacked electrochemical cells. A section of the thermally conductive element is arranged within a corresponding protrusion in the structured side wall. Such a battery system has an improved and cost-efficient cooling system and, therefore, operates safer and is more stable.

In some embodiments, the thermally conductive element has a plate shape and a height that surpasses (e.g., is greater than) the height of the electrochemical cells. In such embodiments, the thermally conductive elements protrude from (or beyond) the stack of electrochemical cells so that they are easily connectable with the protrusion in the structured side wall. For example, the thermally conductive element may extend along an entire height of an electrochemical cell and into the protrusion in the structured side wall.

The thermally conductive elements may be boards or plates, such as metal boards or metal plates.

The section of the thermally conductive element and the corresponding protrusion in the structured side wall are connected with each other via a form-fit connection. For example, the section of the thermally conductive element and the corresponding protrusion in the structured side wall may be connected with each other via a latching form-fit connection. In such embodiments, an easy but very stable connection between the housing of the cooling system and the thermally conductive element is provided.

Further, in a fully assembled state, the section of the thermally conductive element received by the corresponding protrusion may not extend along the entire depth of the protrusion. In some embodiments, the thermally conductive elements are inserted between about 80% and 99% of the depth of the protrusions. For example, in some embodiments, the thermally conductive elements are inserted about 95% of the depth of the protrusions. In such embodiments, the protrusions provide a tolerance compensation in a direction parallel to the depth of the protrusions so that the thermally conductive elements and the stack of electrochemical cells may move towards a bottom of the protrusions.

The depth of the protrusion extends along a direction parallel to or substantially parallel to the height of the first side wall of the housing and/or perpendicular to or substantially perpendicular to the length of the second side wall of the housing. For example, the depth of the protrusion may extend along a direction parallel to or substantially parallel to the height of the electrochemical cell received by the housing.

The battery system may include m battery cells, wherein m is an integer and m≥2. Further, the battery system may include m−1 thermally conductive elements, and one thermally conductive element may be arranged between each adjacent two of the battery cells.

Further aspects and features of the present invention will be learned from the dependent claims and/or the following description.

BRIEF DESCRIPTION OF THE DRAWINGS

Aspects and features of the present invention will become more apparent to those of ordinary skill in the art by describing, in detail, exemplary embodiments thereof with reference to the attached drawings, in which.

DETAILED DESCRIPTION

Figure 1:
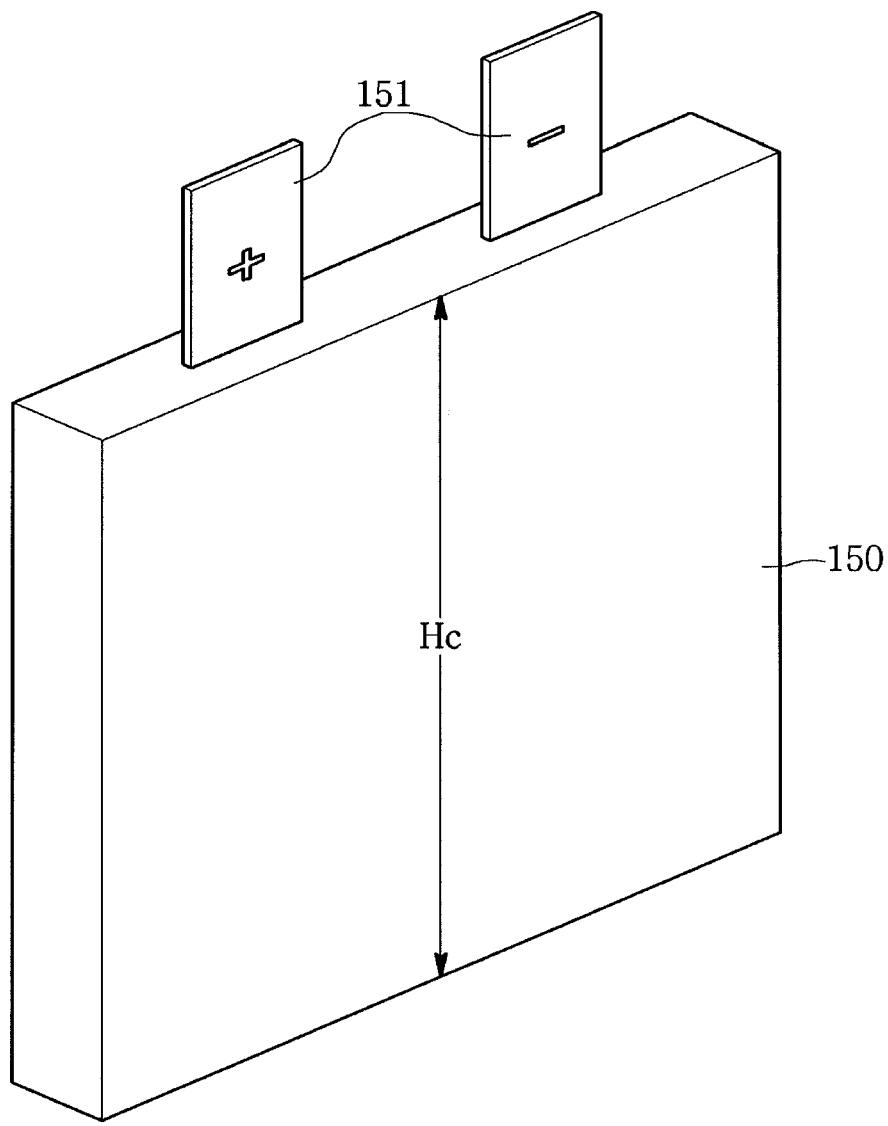
FIG. 1 illustrates a pouch-type cell.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

FIG. 1 shows a pouch-type electrochemical cell 150. The pouch cell 150 has a flat shape having a height Hc and includes poles 151 (e.g., terminals). One of the poles 151 is a positive pole while the other is a negative pole.

Figure 2:
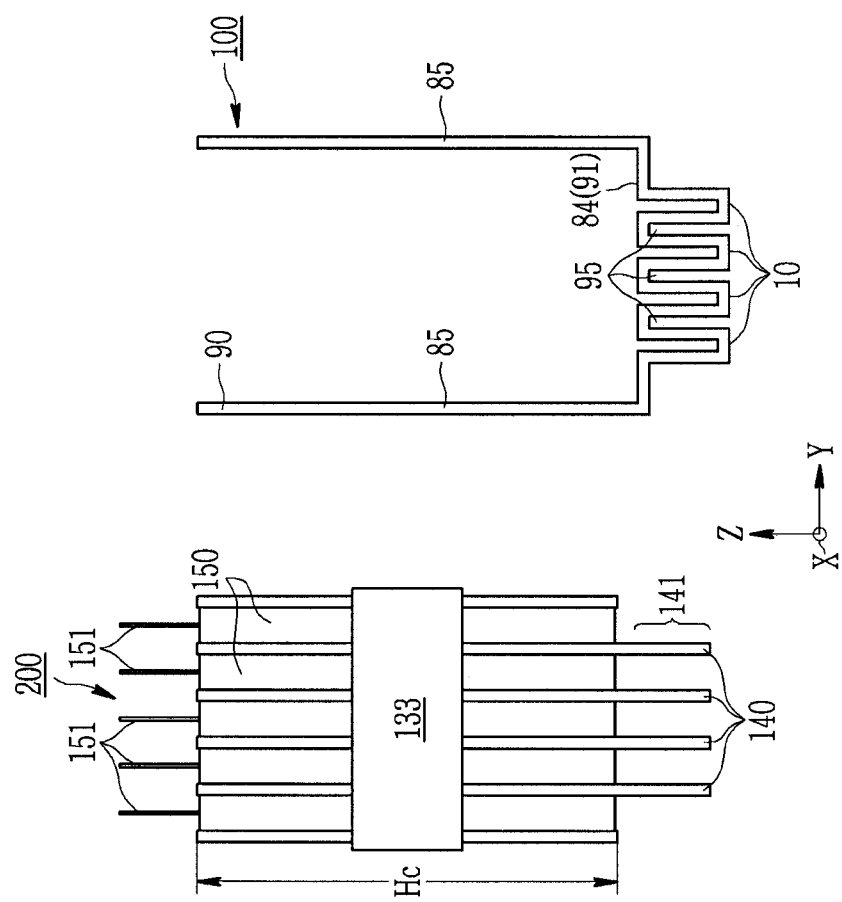
FIG. 2 is a cross-sectional view of a part of a cooling system and a battery system according to an embodiment of the present invention in a disassembled state.

FIG. 2 is a cross-sectional view of a part of a cooling system 100 and a battery system 200 according to an embodiment of the present invention in a disassembled state. On the left side of FIG. 2, the battery system 200 is shown, and on the right side of FIG. 2, the cooling system 100 corresponding to the illustrated battery system 200 is shown. Furthermore, a coordinate system is shown in FIG. 2 for ease of understanding.

The cooling system 100 illustrated on the right side of FIG. 2 is adapted for cooling the electrochemical cells 150 of the battery system 200 illustrated on the left side of FIG. 2. The cooling system 100 includes a housing 90, which receives (or accommodates) a plurality of stacked electrochemical cells 150 of the battery system 200 (in the illustrated embodiment, five electrochemical cells 150 are shown). The housing 90 may be made of a plastic material having low thermal conductivity. However, the housing 90 may be made of other suitable materials. In the illustrated embodiment, the housing 90 includes two first side walls 85 extending parallel to the height Hc of a corresponding electrochemical cell 150 received by the housing 90 and two second side walls 84 extending substantially perpendicular to the first side walls 85. In FIG. 2, only one of the second side walls 84 is shown for ease of understanding. In FIG. 2, the first side walls 85 extend in a height of the housing 90 in a Z-direction of the provided coordinate system, while the second side walls 84 substantially extend in a Y-direction of the provided coordinate system. Furthermore, a length of the housing 90 extends in an X-direction of the provided coordinate system.

In the illustrated embodiment, the housing 90 includes two structured side walls 91 (e.g., the two second side walls 84), each having four protrusions 10 therein. In FIG. 2, only one of the two structured side walls 91 is shown. Each protrusion 10 is adapted to receive a section 141 of a thermally conductive element 140 arranged between adjacent ones of the stacked electrochemical cells 150. For example, a thermally conductive element 140 is arranged between two adjacent electrochemical cells 150 of the stack of electrochemical cells 150 of the battery system 200. The thermally conductive element 140 may be a metal plate, but the thermally conductive element 140 is not limited thereto. The thermally conductive elements 140 (e.g., the metal plates) protrude from (or beyond) the stack of electrochemical cells 150, and each protrusion 10 in the structured side wall 91 is adapted to receive the section 141 of a corresponding one of the thermally conductive elements 140. In the illustrated embodiment, the electrochemical cells 150 and the thermally conductive elements 140 of the battery system 200 are fastened together by a fastening device 133, which may be a metal fastener strap strapped around the stack of electrochemical cells 150 with the thermally conductive elements 140 therebetween. Each of the electrochemical cells 150 includes the two poles 151, of which one of the poles 151 is shown in FIG. 2.

The U-shaped protrusions 10 within the structured side walls 91 of the housing 90 form grooves, which give the structured side walls 91 a meandering cross-section when viewed from imaginary plane that is parallel to the height of the housing 90. However, according to other embodiments, cooling systems may have fewer or more than four protrusions within a structured side wall, and the protrusions may also have other shapes than those illustrated in FIG. 2. The spaces between the protrusions 10 on the outer side of the structured side walls 91 form outer receiving structures 95, each of which are adapted to receive a cooling fin. For example, the room (or space) between the U-shaped protrusions 10, which has an inverted-U-shape, is adapted to receive a cooling fin.

Figure 3A:
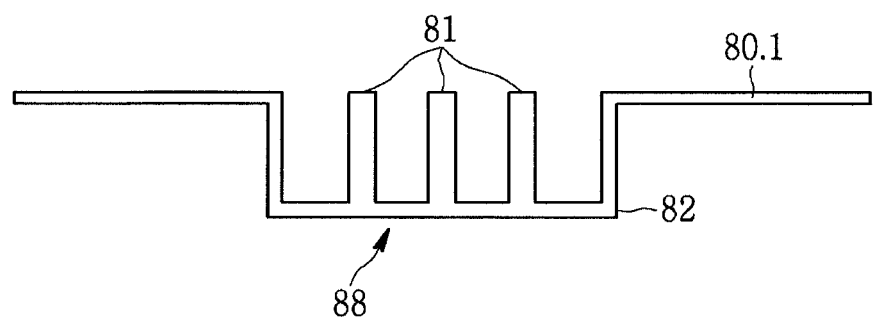
FIGS. 3A and 3B are cross-sectional views of holding devices for the housing of a cooling system according to embodiments of the present invention.
Figure 3B:
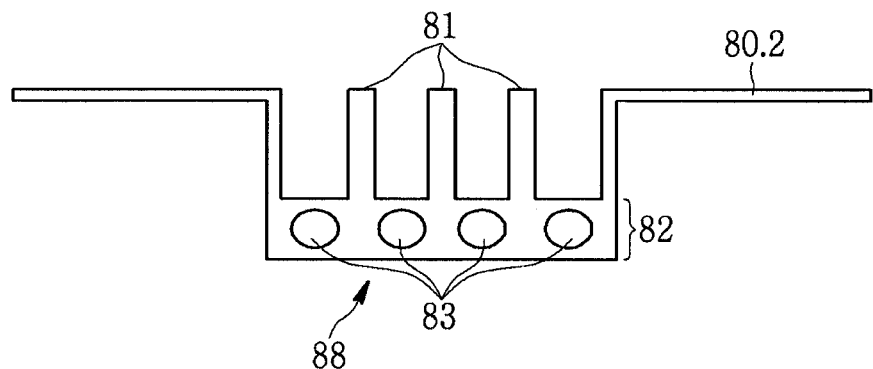

As shown in FIGS. 3A and 3B, cooling fins 81 are a part of holding devices 80.1 and 80.2, respectively. FIG. 3A is a cross-sectional view of a holding device 80.1 for the housing 90 of the cooling system 100 according to an embodiment of the present invention, and FIG. 3B is a cross-sectional view of a holding device 80.2 for the housing 90 of the cooling system 100 according to another embodiment of the present invention. For example, both of the holding devices 80.1 and 80.2 shown in FIGS. 3A and 3B may be used with the housing 90 of the cooling system 100 as shown in FIG. 2. Therefore, the holding devices 80.1 and 80.2 are both adapted to receive the housing 90 of the cooling system 100.

Both of the holding devices 80.1 and 80.2 include three cooling fins 81, which correspond to the outer receiving structures 95 of the structured side walls 91 of the housing 90 shown in FIG. 2. Thus, the cooling fins 81 of the holding devices 80.1 and 80.2 shown in FIGS. 3A and 3B may be inserted into the receiving structures 95 of the structured side walls 91 of the housing 90 shown in FIG. 2 and may engage with the same. Furthermore, both of the holding devices 80.1 and 80.2 include a holding frame 88 adapted to engage with the outer protrusions 10 of the structured side walls 91 and to form a form-fit connection with the same. Both of the holding devices 80.1 and 80.2 have a body section 82, and the cooling fins 81 extend from the body section 82. Therefore, both of the holding devices 80.1 and 80.2 have a comb-shaped design (e.g., a comb-shaped cross-section).

The holding device 80.2 illustrated in FIG. 3B differs from the holding device 80.1 illustrated in FIG. 3A in that the body section 82 of the holding device 80.2 includes four channels 83, which allow for a cooling fluid to flow through the body section 82 of the holding device 80.2. For example, the cross-section of the holding device 80.2 shown in FIG. 3B is pierced with four cooling fluid channels 83, and the cooling fluid channels 83 are respectively aligned with the inverted-U-shaped structures of the holding device 80.2.

The cooling fins 81 of the holding devices 80.1 and 80.2 may each include a thermally conductive material. In some embodiments, the cooling fins 81 are made of a highly thermally conductive metal. However, other suitable materials may be used for the cooling fins 81 of the holding devices 80.1 and 80.2 according to other embodiments the present invention. Furthermore, in other embodiments, a holding device with fewer or more than three cooling fins 81 may be provided. Moreover, other channels (e.g., more or fewer channels) for cooling fluids may be provided within the holding device.

Figure 4:
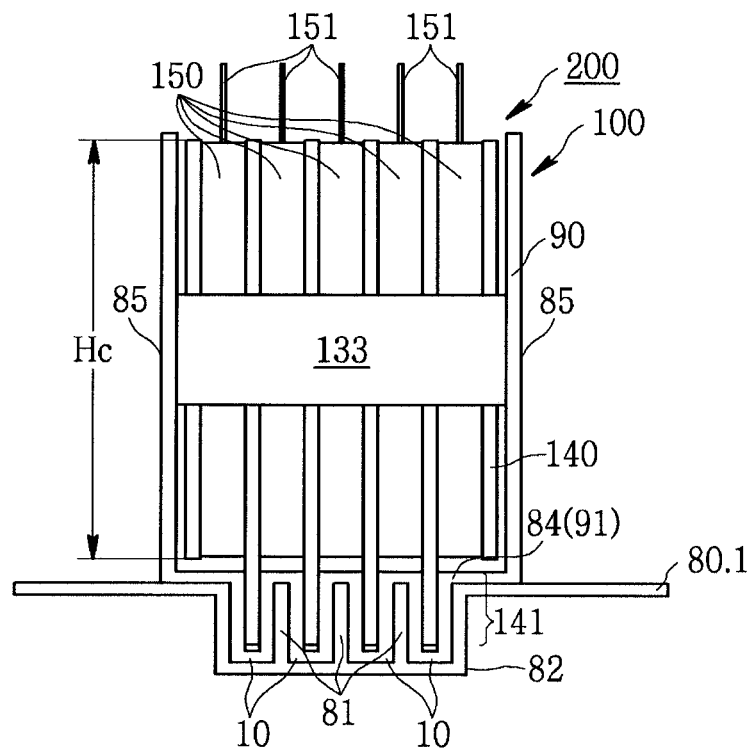
FIG. 4 is a cross-sectional view of a cooling system and a battery system according to an embodiment of the present invention in an assembled state.

FIG. 4 is a cross-sectional view of a cooling system 100 and a battery system 200 according to an embodiment of the present invention. For example, FIG. 4 shows the battery system 200, as shown in FIG. 2, arranged within the housing 90 of the cooling system 100, as also shown in FIG. 2. The housing 90 is held by the holding device 80.1, as shown in FIG. 3A. In an assembled state, the thermally conductive elements 140 engage (e.g., are fitted into) the protrusions 10 of the structured side walls 91 of the housing 90. Similar to FIG. 2, only one of the side walls 91 of the housing 90 is shown. When the electrochemical cells 150 heat up, for example, during operation of the battery system 200, the generated heat is conducted via the thermally conductive elements 140 to the protrusions 10 of the structured side walls 91. From the protrusions 10 of the structured side walls 91, the heat is conducted to the holding device 80, which conducts the heat to an external surrounding of the battery system 200. Therefore, according to embodiments of the present invention, heat generated within the battery system 200 is efficiently transferred to outside of the battery system 200 via the cooling system 100.

In some embodiments, some of the thermally conductive elements 140 have a plate shape with a height that surpasses (e.g., is greater than) the height Hc of the electrochemical cells 150. Thus, some of the thermally conductive elements 140 are taller than others and include the additional section 141 to be received within a corresponding one of the protrusions 10 within the structured side wall 91 of the housing 90. In the embodiment illustrated in FIG. 4, the four thermally conductive elements 140 that are arranged between the two outermost thermally conductive elements 140 include the additional sections 141. Further, in a fully assembled state of the battery system 200, as shown in FIG. 4, the additional sections 141 of the aforementioned thermally conductive elements 140 received by the corresponding protrusions 10 may not extend along the entire depth of the protrusions 10 (e.g., may not extend fully into the protrusions 10). Therefore, a gap may be present between the bottom of the protrusions 10 and the outer surface of the additional sections 141 of the thermally conductive elements 140.

Although exemplary embodiments of the present invention have been described herein, it is understood that the present invention should not be limited to these exemplary embodiments and that various changes and modifications can be made by one ordinary skilled in the art within the spirit and scope of the present invention. Hence, the scope of the present invention shall be determined at least by the technical scope of the accompanying claims and their equivalents.

What is claimed is:

1. A cooling system for cooling electrochemical cells of a battery system, the cooling system comprising:
   a housing configured to accommodate a plurality of stacked electrochemical cells, the housing comprising:
   a structured side wall having a plurality of protrusions therein, the protrusions being adapted to respectively receive a section of a thermally conductive element arranged between two adjacent ones of the stacked electrochemical cells, spaces between adjacent ones of the protrusions on an outer side of the structured side wall forming an outer receiving structure; and
   a holding device configured to receive the housing, the holding device comprising a plurality of cooling fins configured to respectively fit into the outer receiving structure of the structured side wall.

2. The cooling system of claim 1, wherein the housing further comprises first side walls extending parallel to a height of the electrochemical cells accommodated by the housing and second side walls arranged perpendicular to the first side walls, and
   wherein the structured side wall is one of the second side walls.

3. The cooling system of claim 1,
   wherein the structured side wall comprising the protrusions has a meandering cross-section.

4. The cooling system of claim 1, wherein the protrusions in the structured side wall have a U-shaped cross-section.

5. The cooling system of claim 1, wherein the protrusions are grooves in the structured side wall.

6. The cooling system of claim 1, wherein the housing comprises a plastic material.

7. The cooling system of claim 1, wherein the holding device has a body section from which the cooling fins extends.

8. The cooling system of claim 7, wherein the holding device has a channel in the body section thereof, the channel being configured to allow a cooling fluid to flow through the body section.

9. The cooling system of claim 1, wherein the cooling fins comprises a thermally conductive material.

10. A battery system comprising:
    a plurality of stacked electrochemical cells;
    a plurality of thermally conductive elements arranged between adjacent ones of the stacked electrochemical cells;
    a housing accommodating the stacked electrochemical cells, the housing comprising a structured side wall having a plurality of protrusions therein, the protrusions being adapted to respectively receive a section of the thermally conductive elements, spaces between adjacent ones of the protrusions on an outer side of the structured side wall forming an outer receiving structure; and a holding device configured to receive the housing, the holding device comprising a plurality of cooling fins configured to respectively fit into the outer receiving structure of the structured side wall.

11. The battery system of claim 10, wherein the thermally conductive elements each has a plate shape and a height that is greater than a height of the electrochemical cells.

12. The battery system of claim 10, wherein the sections of the thermally conductive elements are respectively received in the protrusions in the structured side wall via a form-fit connection.

13. The battery system of claim 10, wherein, in a fully assembled state, the sections of the thermally conductive elements received by the protrusions do not extend along an entire depth of the respective protrusion.

* * * * *